United States Patent
Hecker et al.

(10) Patent No.: US 6,674,848 B1
(45) Date of Patent: Jan. 6, 2004

(54) METHOD FOR DISPLAYING PERFORMANCE FEATURE NAMES AT A COMMUNICATION TERMINAL EQUIPMENT

(75) Inventors: Hans-Dieter Hecker, München (DE); Gisela Wagner, Maisach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/341,211
(22) PCT Filed: Jan. 22, 1998
(86) PCT No.: PCT/DE98/00196
§ 371 (c)(1),
(2), (4) Date: Jul. 7, 1999
(87) PCT Pub. No.: WO98/35488
PCT Pub. Date: Aug. 13, 1998

(30) Foreign Application Priority Data

Feb. 5, 1997 (DE) .......................... 197 04 344

(51) Int. Cl.$^7$ .............................................. H04M 3/42
(52) U.S. Cl. ............................ 379/201.01; 379/201.12
(58) Field of Search ................ 399/201.01, 201.03, 399/201.04, 201.05, 201.12

(56) References Cited

U.S. PATENT DOCUMENTS 5,485,511 A * 1/1996 Iglehart et al. ......... 379/156 X
5,793,860 A * 8/1998 Brieskorn ................. 399/229
6,058,167 A * 5/2000 Iglehart et al. .......... 379/93.17

FOREIGN PATENT DOCUMENTS

| DE | 44 34 082 A1 | 3/1996 |
| DE | 195 23 537 | 1/1997 |
| EP | 0 419 948 A2 | 4/1991 |
| EP | 0 590 334 A1 | 4/1994 |
| EP | 0 701 381 A2 | 3/1996 |
| WO | WO 95/09505 | 4/1995 |

OTHER PUBLICATIONS

Siemens–Zeitschrift 3–4/96, Kommunication, Kurt Renz, "optiset E hilft dem Telefonbenutzer auf die Sprünge", pp. 26–28. No translation.

* cited by examiner

Primary Examiner—Creighton Smith
(74) Attorney, Agent, or Firm—Staas & Halsey LLP

(57) ABSTRACT

Proceeding from a communication terminal equipment (EGD) whereat performance feature names (LMB) can be displayed menu-controlled in order to provide the user with an offering of the available performance features for a potential selection or, respectively, activation of one of these, a check of the authorization of the user for the individual performance features is provided. To that end, a respective performance feature name (LMB) is only communicated to the communication terminal equipment (EGD) for display thereat when the appertaining performance feature is noted as available in an authorization table (GWBP) allocated to the user.

8 Claims, 2 Drawing Sheets

METHOD FOR DISPLAYING PERFORMANCE FEATURE NAMES AT A COMMUNICATION TERMINAL EQUIPMENT

The invention is directed to a method for displaying performance feature names.

A multitude of known telephone terminal equipment, particularly for connection to private communication systems, comprise a scope of functions that extends far beyond the basic functions of a simple telephone. The user of the terminal equipment is to be given high operating comfort with this scope of functions and supported by specific display and control elements, for example a LC display as well as function and control keys, particularly for rapid activation of performance features.

What is referred to as a menu control is also to be considered a terminal equipment function that significantly increases the operating comfort, this being capable, among other things, of offering a spectrum of functions available to the user that are referred to as performance features in the field of communications technology on the display of the terminal equipment. The offered performance features are thus offered to the user simultaneously for selection or activation.

In this context, a terminal equipment with a menu key control is already known with whose assistance a forward and backward scrolling of menu points that are indicated in the form of individual performance featured names can be implemented at the display of the terminal equipment and that allows a confirmation for the purpose of a selection or, respectively, activation of the menu point displayed or, respectively, selected at the moment.

What a confirmation that has been undertaken effects in the telephone terminal equipment is that a message that identifies the selected performance feature and requests an activation thereof is communicated to the communication system connected to the telephone terminal equipment. The appertaining performance feature is then implemented or, respectively, established in the communication system with reference to the subscriber terminal communicating the message.

As a result of an authorization check undertaken in the communication system wherein a check is carried out to see whether the selected performance feature is available for the appertaining subscriber location in conformity with an authorization scope defined for the subscriber location, the activation of the performance feature is rejected given a negative outcome and an indication is output at the telephone terminal equipment that the desired performance feature cannot be activated.

SUMMARY OF THE INVENTION

An object of the present invention is to provide measures in communication terminal equipment with a display of performance feature names for the purpose of a selection or activation thereof with which such negative messages are avoided.

In general terms the present invention is a method for displaying performance feature names for offering for selection at a display means of a communication terminal equipment, particularly telephone terminal equipment, connected to a subscriber line of a communication system. After receiving a display request for performance features from the communication terminal equipment initiated by the user, a display message is communicated to the communication system. A performance feature table that is stored in the communication system and indicates available performance features independently of subscriber line is set for transmission to the communication terminal equipment. Before a transmission of a respective performance feature name contained in the performance feature table, an authorization of the subscriber line for this performance feature is checked on the basis of an authorization table stored in a data base of the communication system and exhibiting performance features for which the subscriber line is authorized. A transmission of the appertaining performance feature name only ensues given a positive check result.

Advantageous developments of the present invention are as follows.

The selection ensues for the purpose of an activation of a performance feature.

The selection ensues for the purpose of an occupation of a programmable function key of the communication terminal equipment.

A plurality of performance feature tables are stored in the communication system. These are respectively allocated to one of a plurality of terminal equipment statuses. Dependent on the terminal equipment status of the communication terminal equipment present upon initiation of the display request, the performance feature table allocated to this terminal equipment status is set for transmission.

The performance feature tables respectively comprise a plurality of table positions under which a performance feature name can be respectively stored. Given a selection of a performance feature name effected at the communication terminal equipment, the appertaining table position is communicated to the communication system from the communication terminal equipment for identification of the appertaining performance feature.

An allocated performance feature identifier is respectively stored in the performance feature tables for the stored performance feature names. On the basis of the table position communicated from the communication terminal equipment as a result of an implemented selection, the performance feature identifier allocated to the appertaining performance feature is identified and communicated to a selection evaluation means of the communication system.

A plurality of authorization tables are stored in the data base, these being respectively allocated to a group of subscriber lines. The authorization tables respectively comprise a plurality of table positions under which a respective performance feature identifier can be stored. The allocation of performance feature identifiers to table positions is the same in the authorization tables as well as performance feature tables.

It is an advantage of the inventive method that it can also be subsequently implemented without great outlay in an already existing communication system. A redundant maintenance of data is avoided with the coupling to the central data base of the communication system, and a fast access to the respectively current data is assured.

It is to be considered an advantage in the activation of performance features that the activation of performance features with performance feature identifiers can be retained in an existing communication system. Since no performance feature identifiers are communicated to the communication system by the terminal equipment, the input of these identifiers, as required by the user for activation of a performance feature given a traditional terminal equipment, is simulated in the communication system by a user interface module.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
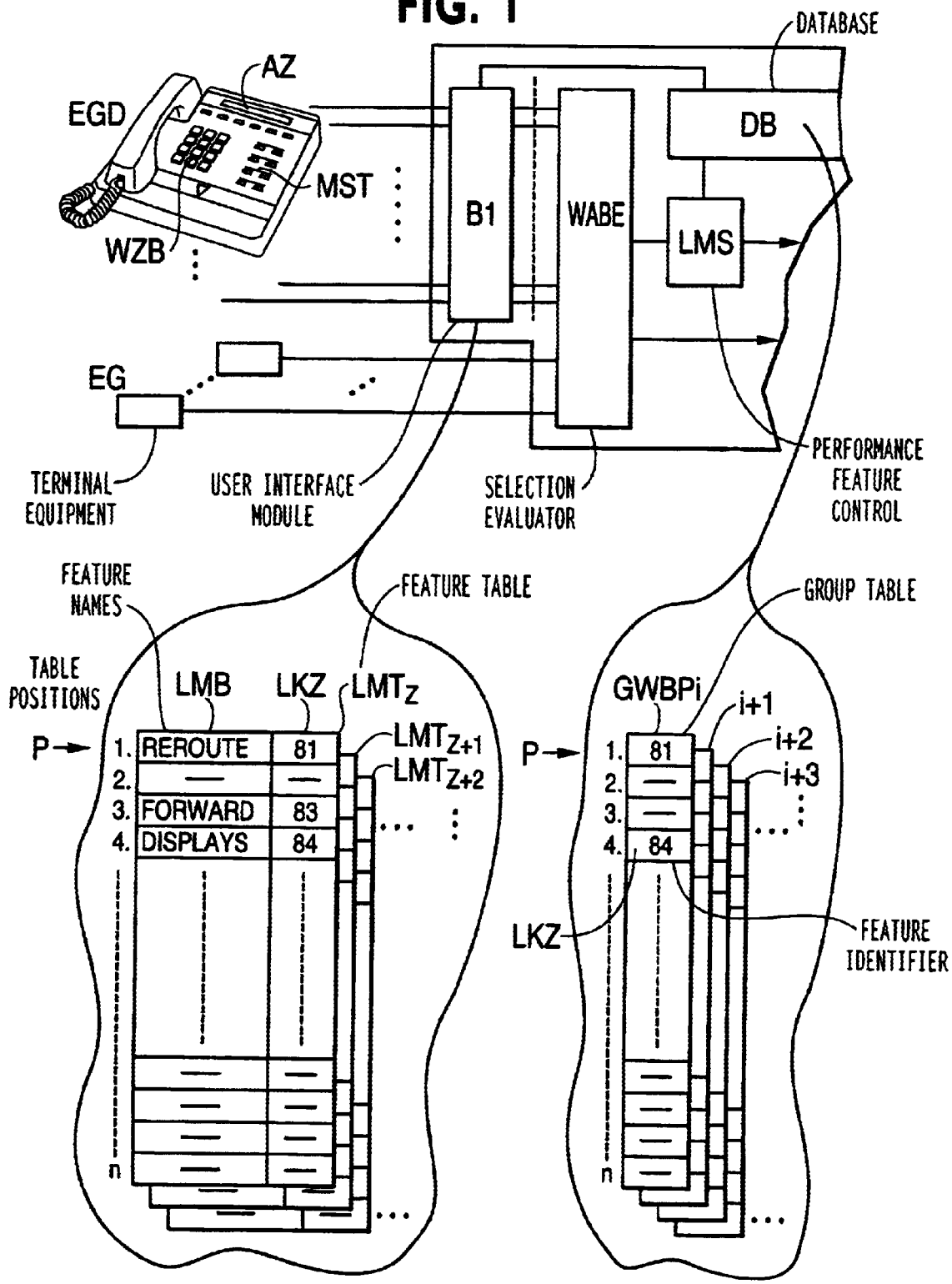
FIG. 1 is a schematic block diagram having the elements critical to an incorporation of the invention into a communication system.

The elements critical for an understanding of the invention, particularly modules and tables, are schematically shown in FIG. 1. Terminal equipment EGD and traditional terminal equipment EG are connected to a communication system KS. The terminal equipment EGD are terminal equipment having a display means, for example an LC display, and menu control keys MST for step-by-step forward and backward positioning of displayed menu points—in the form of performance feature names—as well as for the selection or, respectively, confirmation of the selection of a position menu point. Moreover, the terminal equipment EGD comprise a traditional dial numeral block WZB. The traditional terminal equipment EG, by contrast, are not equipped with a display means AZ for menu presentation and are not equipped with menu control keys MST.

A selection evaluation means WABE, a database DB and a performance feature control LMS in the communication system KS participate in the activation of performance features via traditional terminal equipment EG. A user interface module B1 precedes the selection evaluation means WABE for correspondence with the terminal equipment EGD. The user interface module B1 only makes use of the terminal equipment EGD and simulates the connection of traditional equipment EG with respect to the selection evaluation means WABE. The user interface module B1 also has access to the database DB.

The modules or, respectively, devices addressed within the communication system KS are to be understood as function units realized in program-oriented terms that communicate with one another.

A plurality of authorization tables are established in the data base DB, these being referred to below as selection evaluation group tables GWBPi, i+1, . . . , and respectively representing a defined authorization profile. The users of the communication system, namely, are to be distinguished in view of their authorization to activate performance features. What is referred to as a selection evaluation group wherein an activation of only specific performance features identified in the appertaining selection evaluation group table GWBPi is allowed is thus allocated to each user, i.e. to the subscriber terminal of the user.

Every selection evaluation group therefore has an individual selection evaluation group table GWBPi allocated to it. Table positions p from 1 through n corresponding to the plurality of performance features maximally available in the communication system KS are respectively established therein. The sequence of the performance features, i.e. the allocation of the table positions p to the individual performance features, is defined and remains invariable; for example, the table position p=1 is reserved for the performance feature "reroute call", the table position p=2 is reserved for the performance feature "suppress telephone number display", etc. A performance feature can only be activated by a user when the performance feature identifier LKZ of the performance feature is entered in the appertaining selection evaluation group table GWBPi at the table position p reserved for the appertaining performance feature. When an entry at the appertaining table position p is lacking or when the entered value is invalid, then the user is not authorized to activate the performance feature.

In view of the nature of an activation of performance features in the communication system, let it be mentioned here that a performance feature identifier LKZ identifying the performance feature must be input at a traditional terminal equipment for an activation of a performance feature. This is recognized as such by the selection evaluation means WABE and communicated to the performance feature control LMS. The latter checks the appertaining selection evaluation group table GWBPi in the data base DB and, when an authorization for the performance feature is present—the appertaining performance feature identifier LKZ was thus found in the selection evaluation group table GWBPi—, the performance feature is activated by the performance feature control LMS. When the performance feature identifier LKZ was not found in the selection evaluation group table GWBPi, the performance feature identifier LKZ that has been input is discarded as invalid.

A plurality of performance feature tables LMTz, z+1, . . . that also respectively comprise table positions p from 1 through n for the performance features maximally present in the communication system KS are established in the user interface module BI that is introduced into the communication system KS for an implementation of the inventive method. The allocation of table positions p and performance features is thereby the same as in the selection evaluation group tables GWBPi, i+1, . . .

The performance feature tables LMTZ, z+1, . . . , are respectively allocated to a terminal equipment status, i.e., there are different statuses of the terminal equipment that, for example, are produced by the user and wherein some performance features cannot or dare not be activated, system-conditioned. Every possible terminal equipment status z has a corresponding performance feature table LMTz, z+1, . . . allocated to it, only the performance features that are activatable system-conditioned in the appertaining status of the terminal equipment being respectively identified therein in the form of a performance feature name LMB and a performance feature identifier LKZ at the appertaining table position P [sic].

The performance feature names LMB are respectively deposited in the performance feature table LMT in the form of a text, and the performance feature identified LKZ are identical to the performance feature identifiers LKZ to be input at traditional terminal equipment EG for the activation of performance features.

Figure 2:
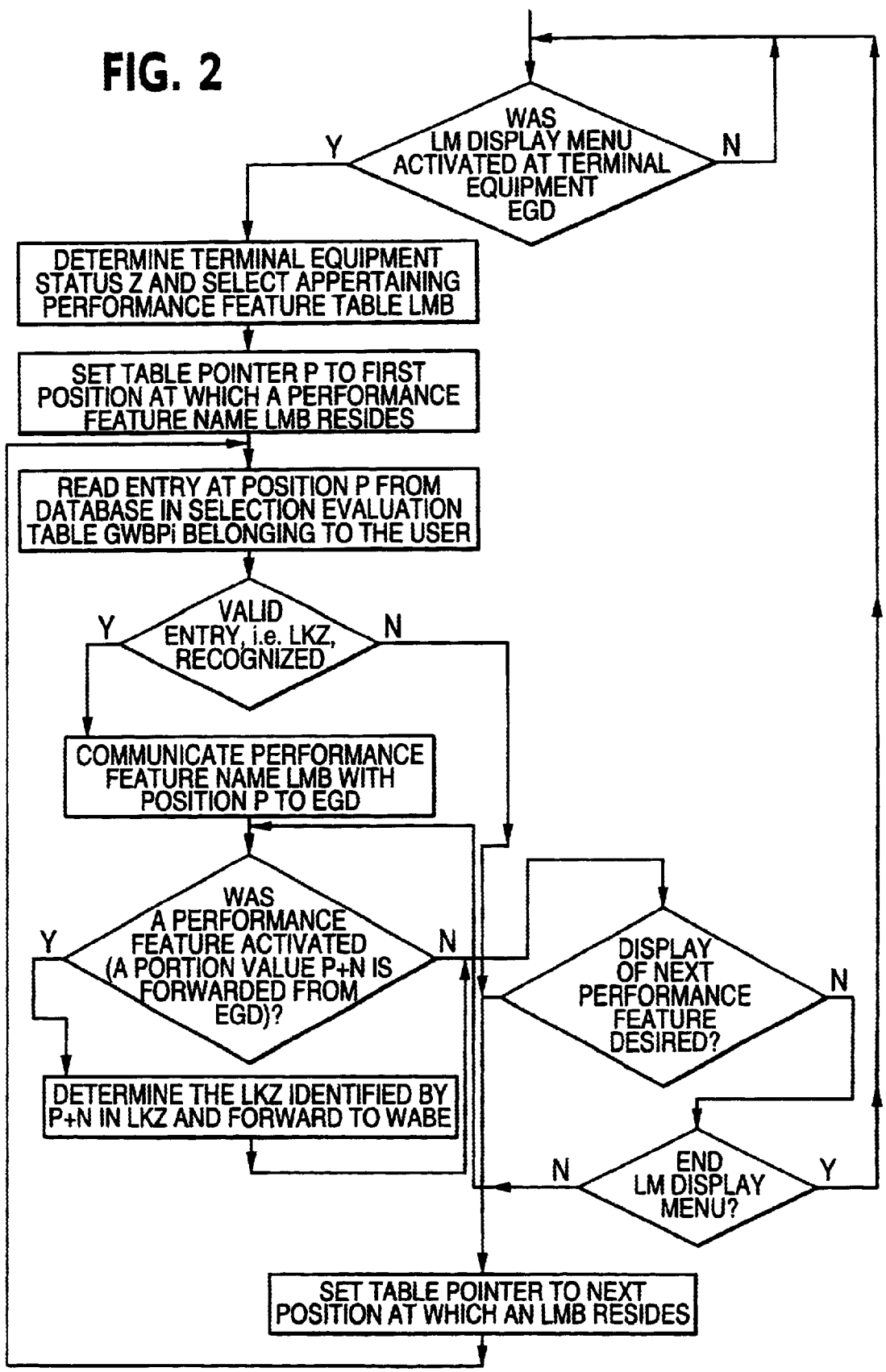
FIG. 2 is a flow chart with the critical method steps based on the inventive method.

FIG. 2 shows a flow chart with method steps that occur in the framework of an implementation of the inventive method. As soon as the intent of the user to activate a performance feature (not yet identified) was recognized at the terminal equipment EGD by actuation of corresponding keys and a display message was subsequently communicated to the communication system KS, the terminal equipment status z of the appertaining terminal equipment EGD is identified in the user interface module BI and the appertaining performance feature table LNTz is selected.

A table pointer is set to the lowest table position p at which a performance feature name LMB is noted. The referenced table position p is subsequently communicated to the data base DB wherein the entry located at the communicated table position p is read out from the selection evaluation group table GWBPi belonging to the user and is communicated back to the user interface module BI.

When a valid performance feature identifier LKZ was transmitted back—i.e., the user is authorized for activation of the performance feature—, the performance feature name LMB referenced in the performance feature table LMT by the table pointer is communicated to the terminal equipment EGD for display. In addition, the appertaining table position p is also communicated to the terminal equipment EGD.

When a selection or, respectively, activation of a displayed performance feature was recognized at the terminal equipment EGD by actuating the menu control keys, the terminal equipment EGD communicates the table position p belonging to the selected performance feature name LMB back to the user interface module. On the basis of this table position p communicated back, the performance feature identifier LKZ referenced by the table position p is identified in the performance feature table LMTz and is forwarded to the selection evaluation means WABE.

When no activation of a performance feature was undertaken and a display of further performance features is desired, the table pointer is set to the next table position p in the performance feature table LMTz wherein a performance feature name LMB is entered. The table position p referenced by the table pointer is in turn communicated to the data base DB for the readout of the entry in the selection evaluation group table GBBPi [sic] located at this table position p.

In addition to a display of performance features with the intent of activating one of these, a display of performance feature statuses is also possible at the terminal equipment EGD, i.e., for example, whether a "variable call rerouting" is activated or deactivated or whether a "call protection" is activated or deactivated. The above-described method is also used for a display of these performance feature statuses, whereby a status of the appertaining performance feature is also read out from the data base and communicated to the terminal equipment EGD. A possible activation of a performance feature, however, need not be taken into consideration in the display of performance feature statuses.

A modification of the above-described method takes effect in the possible occupation of programmable function keys at the terminal equipment EGD. When the terminal equipment EGD comprises programmable function keys, these can be occupied with a specific function, i.e., for example, with the function of activating a specific performance feature or deactivating it. In the occupation of a programmable function key, proposals are made to the user on the basis of a menu as to which function should be assigned to the appertaining programmable function key. Thus, for example, a programmable function key can be set as call rerouting key, conference key, direct call key, mail box key, parking key, etc. The user can select the desired function from the variety that has been offered and can occupy the appertaining programmable key with this.

A further table (not shown) that contains all function key names coming into consideration and from which, analogous to the performance feature names LMB in the performance feature table LMT, function key names, i.e. ultimately performance feature names, are displayed at the terminal equipment EGD is deposited therefor in the user interface module BI. Before a performance feature name is displayed, i.e. offered for occupation, a check belonging to the selection evaluation group of the user ensues in the data base as to whether an occupation of a programmable function key with this performance feature name is allowed at the terminal equipment or not. This is in turn ultimately dependent on whether the appertaining user is authorized to activate the performance feature. Only when the user is authorized to activate the performance feature is the appertaining performance feature name offered to the user for occupation of a programmable function key.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for obtaining performance feature names at a communication terminal, comprising the steps of:

receiving a display message from the communication terminal, after a user requests performance features to be displayed;

storing a performance feature table containing entries each of which identifies a performance feature by a corresponding identifier and a corresponding name, the performance feature table being generic for a plurality of communication terminals;

consulting an authorization table to determine which performance features are authorized for the communication terminal, the authorization table containing entries each of which identifies a performance feature by the corresponding identifier and identifies authorization status for the communications terminal, the authorization table being specific for the communications terminal; and transmitting names of performance features to the communications terminal for the performance features which are authorized for the communications terminal.

2. The method of according to claim 1, wherein upon receiving a display message from the communication terminal for the performance feature selected, a process of activating the performance feature is initiated.

3. The method according to claim 1, wherein a programmable function key of the communication terminal is utilized to select the display message.

4. The method according to claim 1, wherein a plurality of performance feature tables are stored in a user interface module, each of the performance feature tables being respectively allocated to one of a plurality of communication terminal statuses; and wherein, dependent on the communication terminal status present upon initiation of the display request, a performance feature table allocated to the communication terminal status is set for transmission.

5. The method according to claim 1, wherein the performance feature table has a plurality of table positions under which to store a performance feature name; and wherein, given a selection of a performance feature name effected at the communication terminal equipment, an appertaining table position is communicated to the communication system from the communication terminal equipment for identification of an appertaining performance feature.

6. The method according to claim 5, wherein an allocated performance feature identifier is respectively stored in the performance feature tables for the stored performance feature names; and wherein, based on a table position communicated from the communication terminal as a result of an implemented selection of a performance feature, the corresponding identifier allocated to the performance feature is identified and communicated to the authorization table.

7. The method according to claim 1, wherein a plurality of authorization tables are stored in a data base, the authorization tables being respectively allocated to a group of subscriber lines;

wherein the authorization tables respectively have a plurality of table positions under which the respective performance feature identifiers are storable; and wherein the performance feature identifiers are allocated to a same location in the authorization tables of the data base as in the performance feature tables of the user interface module.

8. A method for simulation of a non-display enabled communication terminal equipment, by a display-enabled communication terminal equipment connected to a subscriber line, of selection of performance features consistent with selection of performance features by a non-display enabled communication terminal equipment, comprising:

intercepting, by a user interface module of a communication system, a request for a selected performance feature in a display list of the display-enabled communication terminal equipment;

matching the selected performance feature with a performance feature name in a user interface module table;

sending a line number in the user interface module table to a data base of the communication system, wherein the line number in the user interface module table corresponds to a line number of an authorization table in the data base, identifying the selected performance feature; and activating the performance feature for the subscriber line if the authorization table indicates that the performance feature is available.

* * * * *